July 13, 1926.  
C. N. FAIRCHILD  
IGNITION CONTROL LOCK  
Filed April 19, 1924
1,592,089
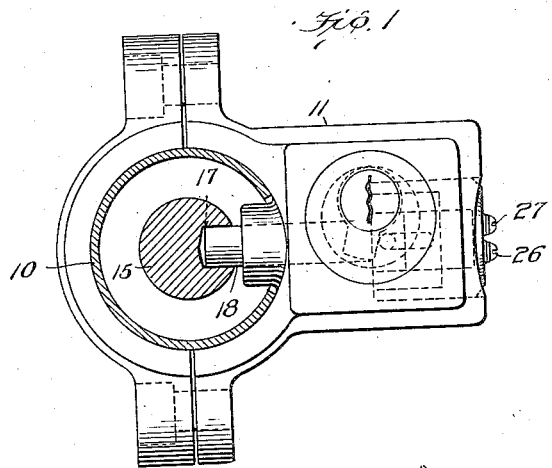
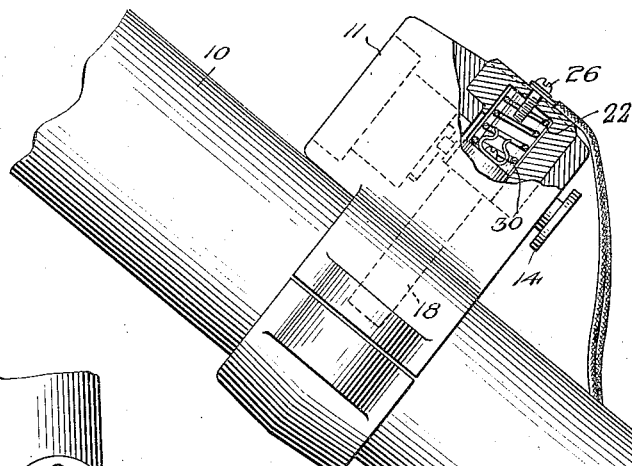
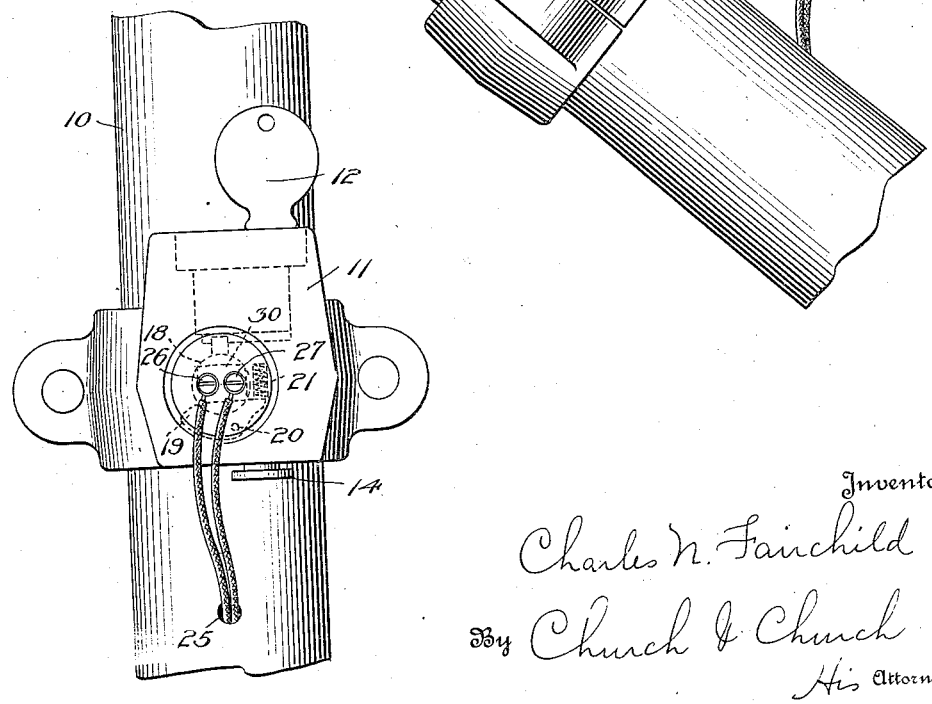
Inventor  
Charles N. Fairchild  
By Church & Church  
His Attorney Patented July 13, 1926.

1,592,089

UNITED STATES PATENT OFFICE.

CHARLES N. FAIRCHILD, OF NEW YORK, N. Y., ASSIGNOR TO FAIRCHILD LOCK CORPORATION, OF THE COUNTY OF NEW CASTLE, DELAWARE.

IGNITION-CONTROL LOCK.

Application filed April 19, 1924. Serial No. 707,774.

This invention relates to automobile locks and ignition systems, and has for its object the provision of means whereby the usual key-operated ignition switch is eliminated and the making and breaking of the ignition circuit is automatically controlled by the means for locking the automobile against theft.

The underwriters sell theft insurance for automobiles at different rates, the rate, for example, for a car which has a steering post lock is considerably less than the insurance on the same car not provided with such lock; the thought being that the lock will be used. Unfortunately for the insurance companies, however, owners secure the lower rate and then fail to lock their cars and if the car is stolen when unlocked the insurance company has to pay the insurance and loses the difference between the two rates.

In the present invention, since the ignition control is entirely automatic, it is impossible to open the ignition system without locking the car, and similarly the car cannot be unlocked without starting the engine.

In the drawings,—

Figure 1 is a plan view of my device as applied to a Chevrolet car.

Figure 2 is a side elevation.

Figure 3 is also a side elevation but is taken at right angles to the view shown in Fig. 2.

In the drawings, 10 is the tubular casing of the steering post of a car of any desired length, here specifically illustrated as a Chevrolet, the tube or casing 10 being round in this case. The means for locking the steering post rod against movement about its axis may be any one of the usual types, but is preferably a lock of the kind wherein there is a housing 11 firmly secured to the tube 10 and the lock is controlled for unlocking by a key, such as 12, and for locking by a push-button such as shown at 14.

In the lock here illustrated the steering rod 15 is recessed as at 17 to receive a spring-pressed bolt 18, which is held in unlocked position by the pawl 19 pivoted as at 20 and held in locking position by the spring 21. The push-button 14 engages the pawl 19 and allows the spring 22 to shoot the bolt into the recess 17.

Instead of carrying a wire of the ignition system to a key-controlled switch, as is customary, I bring this wire up the tube or casing 10 through a hole such as 25 and provide two spaced and insulated terminals 26 and 27 which, when electrically connected, close the ignition circuit and permit the engine to operate.

The means for electrically connecting the two contacts 26 and 27 of the ignition system is here illustrated as a spring-clip 30 of any conducting material, but preferably steel, and secured to the bolt 15, so that when the bolt is retracted, that is, in unlocked position, the two contacts 26 and 27 are electrically connected and the ignition system circuit is closed, but when the bolt is shot by pressing the button 14 the clip withdraws from the contacts and opens the circuit.

I have given a specific illustration of an application of my locking system, but I wish it distinctly understood the invention is not limited to the specific structure shown, but contemplates the use of locks of very different types and in very different locations, some having bolts and others having mere pivoted catches. In each case, however, it is the locking of the bolt or catch, or similar means, that opens the ignition circuit.

What I claim is:

In a steering post lock, a bolt, a spring for shooting said bolt to locking position, a manually controlled trip for holding said bolt in unlocked position, an ignition circuit, and means located on the longitudinal end of the bolt distant from the steering post and surrounded by said spring for closing the ignition circuit when the bolt is withdrawn and for breaking the ignition circuit when the bolt is moved to locking position.

CHARLES N. FAIRCHILD.